(12) United States Patent
Ryou

(10) Patent No.: US 7,697,609 B2
(45) Date of Patent: Apr. 13, 2010

(54) APPARATUS AND METHOD FOR ENCODING AND DECODING A MOVING PICTURE USING DIGITAL WATERMARKING

(75) Inventor: Jung-Ryul Ryou, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1158 days.

(21) Appl. No.: 10/842,500

(22) Filed: May 11, 2004

(65) Prior Publication Data

US 2004/0228409 A1  Nov. 18, 2004

(30) Foreign Application Priority Data

May 13, 2003  (KR) .................. 10-2003-0030268

(51) Int. Cl.
*H04N 7/12*  (2006.01)
(52) U.S. Cl. ................. 375/240.16; 375/240.01; 375/240.1
(58) Field of Classification Search ............ 375/240.16, 375/240.01, 240.1
See application file for complete search history.

(56) References Cited

U.S. PATENT DOCUMENTS

| | | | | |
|---|---|---|---|---|
| 5,619,256 | A * | 4/1997 | Haskell et al. ................. | 348/43 |
| 6,055,012 | A | 4/2000 | Haskell et al. | |
| 2002/0087864 | A1 | 7/2002 | Depovere et al. | |
| 2004/0008923 | A1* | 1/2004 | Anzai et al. ................. | 385/16 |
| 2005/0271303 | A1* | 12/2005 | Simpson ................. | 382/305 |
| 2006/0133493 | A1* | 6/2006 | Cho et al. ................. | 375/240.16 |

FOREIGN PATENT DOCUMENTS

| | | |
|---|---|---|
| CN | 1256579 | 1/2005 |
| JP | 2000-059753 | 2/2000 |
| JP | 2000-165654 | 6/2000 |
| JP | 2000-350209 | 12/2000 |
| JP | 2001-285895 | 10/2001 |

OTHER PUBLICATIONS

Cox et al., A Secure, Imperceptable Yet Perpetually Salient, Spread Spectrum Watermark for Multimedia, Southcon '96, Communications Applications and Technology, Educational Issues, Emerging Technology, Microelectronics/Computer Applications, Product Development and Manufacturing, Orlando, Jun. 25-27, 1996, New York, IEEE, US, 1996, pp. 192-197.

(Continued)

*Primary Examiner*—Andy S Rao
*Assistant Examiner*—Geepy Pe
(74) *Attorney, Agent, or Firm*—Ked & Associates LLP

(57) ABSTRACT

An apparatus and method for encoding/decoding a moving picture uses a digital watermark for copyright protection and/or other identifying purposes. This is accomplished by embedding encoding information of a first moving picture obtained by one camera in a second moving picture obtained by another camera in a digital watermark format. The second moving picture is encoded through motion compensation. By extracting the digital watermark from the second moving picture encoded data and decoding the second moving picture, the first moving picture is motion compensated-decoded using the extracted digital watermark. Accordingly, it is possible to improve a compression rate of a multi viewpoints moving picture having lots of data quantity.

29 Claims, 5 Drawing Sheets

OTHER PUBLICATIONS

Puri et al., Basics of Stereoscopic Video, New Compression Results with MPEG-2 and a Proposal for MPEG-4, Signal Processing Image Communication, Elsevier Science Publishers, Amsterdam, NL, vol. 10, No. 1-3, Jul. 1, 1997, pp. 201-234.

Swanson et al., Data Hiding for Video-in-Video, Image Processing, 1997, Proceedings, International Conference on Santa Barbara, CA, USA, Oct. 26-29, 1997, Los Alamitos, CA, USA, IEEE Comput. Soc. US, Oct. 26, 1997, pp. 676-679.

Chinese Office Action dated Jul. 13, 2007 and its English translation.

* cited by examiner

STEREO MOVING PICTURE

MULTI VIEWPOINTS MOVING PICTURE

APPARATUS AND METHOD FOR ENCODING AND DECODING A MOVING PICTURE USING DIGITAL WATERMARKING

BACKGROUND OF THE INVENTION

1. Field of the Invention

The present invention generally relates to processing multimedia information, and in particular to an apparatus and method for encoding and/or decoding a moving picture using digital watermarking techniques.

2. Description of the Related Art

In order to communicate images which have a real and natural appearance, a number of three-dimensional image communication techniques have been developed. In next-generation image processing, a three-dimensional image processing method which uses a binocular image (e.g., an image at which depth can be perceived by recognizing an object with binocular of a human being) has been a matter of grave concern. Because today most images are color moving pictures, transmission rate on a communication channel and processing speed are very important considerations. To enhance transmission rate and processing speed, increasing image information quantity required to obtain the so-called cubic effect has become of critical interest. Accordingly, it is urgent to develop a method for compressing image information easily and efficiently while maintaining picture quality of a cubic image.

FIGS. 1A and 1B illustrate a related-art method for obtaining a three-dimensional moving picture. Left and right eyes of a human being show two-dimensional images which are different from each other. When the two images are transmitted to the brain through the retina, the brain accurately fuses them into one image. Accordingly, depth and reality of the original three-dimensional image can be reproduced. Herein, a three-dimensional moving picture means an image obtained using plural cameras taking into consideration the visual characteristics of a human being.

FIG. 1A shows a related-art method for obtaining a three-dimensional moving picture (stereo moving picture) of one viewpoint. Pictures 5, 7 respectively photographed by cameras 1, 3 correspond to two eyes of a human being. These pictures are fused to produce a moving picture (stereo moving picture) having one viewpoint. Herein, viewpoint means a point at which depth (or cubic effect) is perceived through the two pictures 5, 7.

FIG. 1B shows a related-art method for obtaining a three-dimensional moving picture having multi viewpoints. In order to improve depth and reality, pictures 21-24 photographed by plural cameras 11-14 are fused to produce a moving picture having multiple viewpoints.

In encoding a three-dimensional moving picture having multiple viewpoints, the quantity of data produced or required is directly proportional to the number of viewpoints, e.g., unlike two-dimensional moving picture encoding the quantity of data increases with increasing numbers of viewpoints. In order to reduce the vast quantity of data that is involved, the related-art moving picture encoding apparatus performs disparity estimation to eliminate overlap between the viewpoints.

In encoding a two-dimensional moving picture, disparity estimation is used for eliminating overlap between picture frames on a temporal axis. This technique is applied for viewpoints of a three-dimensional moving picture. Accordingly, disparity estimation is a technique for searching for overlap between viewpoints in a three-dimensional moving picture. For example, in a stereo moving picture, disparity estimation means searching a block of a right image most similar to a block of a left image.

Motion estimation involves calculating a motion vector by performing motion estimation between two picture frames, performing motion compensation according to the motion vector, eliminating overlap between picture frames on the same temporal axis, and transmitting a difference between the motion-compensated previous frame and a present frame.

FIG. 2 shows a method for estimating disparity and motion of a stereo moving picture, which is taken as an example of a general three-dimensional moving picture. General moving pictures are processed in picture units involving an I picture (intra picture), a P picture (predictive picture), and a B picture (bidirectionally predictive picture). The I picture is an intra-encoded picture, the P picture is a picture forwardly predicted based on the I picture, and the B picture is embedded between the I picture and P picture. More specifically, the B picture is a picture forwardly predicted from the I picture and backwardly predicted from the P picture.

In a general stereo moving picture, a left sequence is moving picture-encoded using general motion estimation and a right sequence is moving picture-encoded using a vector value and a difference picture obtained through disparity estimation.

FIG. 3 is a block diagram showing a general stereo moving picture encoding apparatus. This apparatus includes a first motion estimator 30, a second motion estimator 32, a disparity estimator 34, a motion compensated encoder 36, and motion/disparity compensated encoder 38. The first motion estimator performs motion estimation using an input left sequence and outputs a motion vector 31 relating to a left sequence frame. The second motion estimator performs motion estimation using a right sequence and outputs a motion vector 41 relating to right sequence frame. The disparity estimator performs disparity estimation between the left sequence frame of the first motion estimator and the right sequence frame of the second motion estimator. The motion compensated encoder encodes the left sequence frame using the motion vector output from the first motion estimator and outputs left sequence encoded data 43. The motion/disparity compensated encoder encodes the right sequence frame using motion vector 41 and disparity vector 42 and outputs an encoded right sequence data 44.

Operation of the general stereo moving picture encoding apparatus will now be described. The first motion estimator 30 estimates motion about the left sequence and outputs a motion vector. In addition, the first motion estimator outputs a difference picture between the picture C(left picture) restored by the motion vector and the original picture (original left picture). The motion compensated encoder 36 outputs the left sequence encoded data 43 by encoding the left sequence frame using the motion vector and the difference picture (difference picture in the left sequence).

Like the first motion estimator, the second motion estimator 32 performs motion estimation for the left sequence and outputs a difference picture (difference picture in the right sequence) with the motion vector 41. The disparity estimator 34 outputs the disparity vector 42 by finding redundancy between the left picture and right picture. The motion/disparity compensated encoder 38 encodes the right sequence frame using the motion vector 41, the difference picture (difference picture in the right sequence), and the disparity vector 42.

The general stereo moving picture encoding apparatus thus receives both the left sequence encoded data 43 output from the motion compensated encoder 36 and the right sequence encoded data 44 output from the motion/disparity compensated encoder 38. Accordingly, the left sequence encoded data 43 and the right sequence encoded data 44 are sequentially received.

Unlike the left sequence encoded data 43, the right sequence encoded data 44 is data obtained by encoding the motion vector 41 for the right sequence, the difference picture (difference picture in the right sequence) and the disparity vector 42. The left sequence encoded data, the motion vector of the right picture, the difference picture, and the estimated disparity vector are transmitted after estimating disparity between the left and right pictures.

A general stereo moving picture decoding apparatus receives the left sequence encoded data, the motion vector of the right sequence, the difference picture and the disparity vector, restores the left picture using the left sequence encoded data, and the right picture is then compensated and restored using the restored left picture information, the motion vector and the difference picture of the right picture and the disparity vector.

However, in the general stereo moving picture encoding apparatus, because both the left sequence encoded data and the right sequence encoded data (the motion vector and the difference picture of the right picture, and the disparity vector) are used, the quantity of data to be transmitted is increased more than that of the related-art secondary moving picture encoder. Consequently, data cannot be smoothly processed with the transmission rate of a conventional transmission channel and processing speed. In addition, by using multiple viewpoint moving picture, data quantity is increased even more.

SUMMARY OF THE INVENTION

An object of the present invention is to solve one or more problems of the related-art and/or to achieve at least one of the following advantages.

Another object of the present invention is to provide an apparatus and a method for encoding/decoding a moving picture using digital watermarking, which improves a compression rate by embedding encoding information in pictures through digital watermarking and which is compatible with a general moving picture encoding/decoding apparatus.

In accordance with one embodiment, an apparatus for encoding/decoding a moving picture using digital watermarking includes a moving picture encoding unit for embedding encoding information of a first moving picture in a second moving picture as a digital watermark format and encoding the second moving picture through motion compensation; and a moving picture decoding unit for extracting the digital watermark from second moving picture-encoded data transmitted from the moving picture encoding unit, decoding the second moving picture and motion-compensated- decoding the first moving picture by using the extracted digital watermark.

The first moving picture is one of moving pictures configuring a multi viewpoints three-dimensional moving picture, and the second moving picture is the other one of moving pictures configuring the multi viewpoints three-dimensional moving picture.

The moving picture encoding unit includes a first motion estimator for estimating motion of the first picture and outputting a first motion vector; a second motion estimator for estimating motion of the second picture and outputting a second motion vector; a disparity estimator for performing disparity estimation between the first picture and the second picture and outputting a disparity vector; a watermark embedding unit for setting a motion vector of the first moving picture and a disparity vector between the first moving picture and the second moving picture as a digital watermark and embedding the digital watermark in the second moving picture; and a motion compensated encoder for encoding the second moving picture in which the digital watermark is embedded.

The moving picture decoding unit includes a motion compensated decoder for decoding the second moving picture-encoded data by using motion compensation; a watermark extractor for extracting a digital watermark from a pertinent position of a frame decoded in the motion compensated decoder and determining a motion vector and a disparity vector of the first moving picture from the extracted watermark; and a motion/disparity compensated decoder for decoding the first moving picture by using the motion vector and the disparity vector of the first moving picture and the decoded second moving picture.

A moving picture encoding/decoding method using digital watermarking includes setting encoding information of a first picture obtained by one camera as a digital watermark; digital-watermarking a second picture obtained by the other camera; motion compensated-encoding the digital watermarked second picture; transmitting the encoded second picture; and motion compensated decoding the transmitted second picture.

DETAILED DESCRIPTION OF THE PREFERRED EMBODIMENT

With the rapid development of networks, computer communications, the Internet and digital data transmission enhancements, copyrighted and other forms of protected intellectual property have been violated by illegal copying. Accordingly, digital watermarking techniques have been researched to prevent illegal copying and to protect intellectual property efficiently. These techniques involve embedding a digital watermark in the digital format of the intellectual property, e.g., a bit pattern is embedded in a digital image or digital audio and video files.

In order to use digital watermarking efficiently, the digital watermark may have characteristics such as invisibility, robustness, and unambiguity. When an invisible digital watermark is embedded in an original image, because there is little change in the original image it is difficult to detect the watermark. When a robust digital watermark is embedded in an important portion of a signal, it is possible to extract the watermark even though there are various kinds of deformations or attacks. When an unambiguous digital watermark is used, it maintains its accuracy even though the watermark is extracted. Accordingly, it is possible to assert certain proprietorship.

Digital watermarking methods can classified into methods performed in the spatial domain and methods performed in the frequency domain. For digital watermarking in the spatial domain, the watermark is embedded by directly converting a pixel value of a picture without using a conversion equation. However, this digital watermarking method may be susceptible to picture deformation or noise. For performing a digital watermarking method in the frequency domain, the watermark is embedded by varying a frequency coefficient. For example, using the DCT (discrete cosine transform), an important coefficient of the frequency domain may be extracted and a watermark can be embedded in this coefficient. Using a DFT (discrete fourier transform), a watermark can be embedded in a phase.

In accordance with one or more embodiments of the present invention, a digital watermark embedded in a digital file is used to encode a moving picture. Encoded information about the picture (obtained by the camera) is then transmitted by being embedded in another picture (obtained by the other camera).

Figure 4:
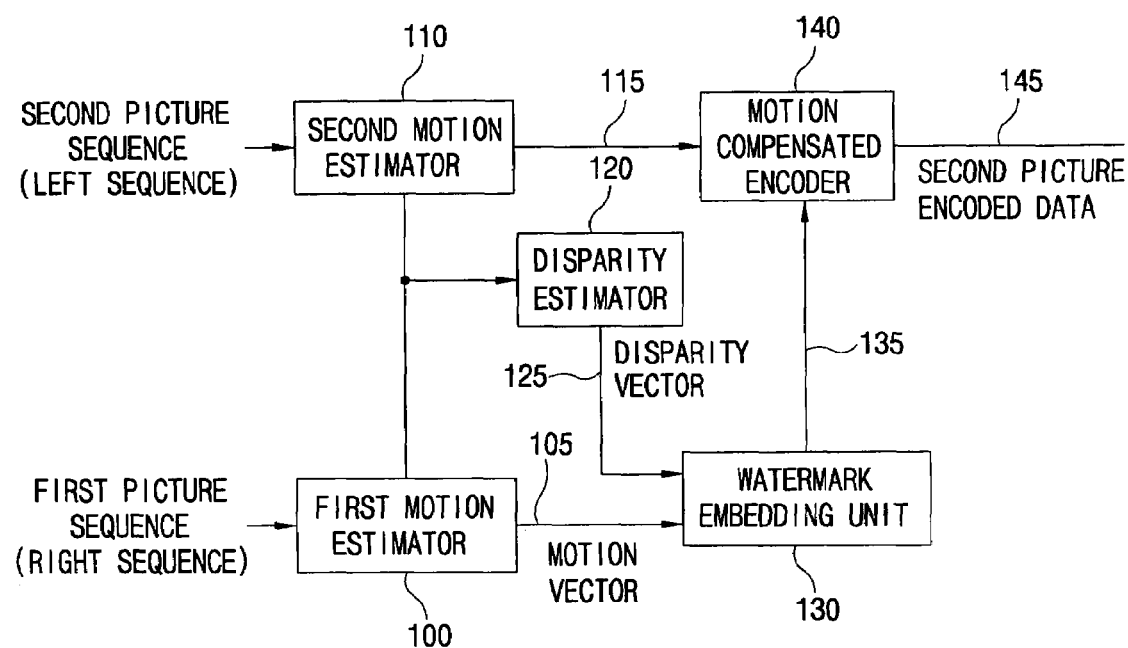
FIG. 4 is a block diagram showing a moving picture encoding apparatus which uses digital watermarking in accordance with a preferred embodiment of the present invention.

FIG. 4 is a block diagram showing an apparatus for encoding a moving picture using digital watermarking in accordance with a preferred embodiment of the present invention. This apparatus includes a first motion estimator 100, a second motion estimator 110, a disparity estimator 120, a watermark embedding unit 130, and a motion compensated encoder 140. The first motion estimator estimates motion of a first picture frame and outputs a first motion vector 105. The second motion estimator estimates motion of a second picture frame and outputs a second motion vector 115. The disparity estimator performs disparity estimation between the first picture of the first motion estimator and the second picture of the second motion estimator and outputs a resulting disparity vector 125. The watermark embedding unit sets a digital watermark 135 based on the first motion vector 105 and the disparity vector 125, and embeds the set digital watermark in encoding of the second picture. The motion compensated encoder encodes the second picture using the second motion vector 115 and outputs second picture encoded data 145.

In the moving picture encoding apparatus of the present invention, by setting encoding information about the first picture (obtained by the first camera), namely, the disparity vector and the motion vector, as a digital watermark and embedding the digital watermark in the second picture (obtained by the second camera), the digital-watermarked second picture is encoded.

Consider, for example, a stereo moving picture where, a first picture is a right picture and a second picture is a left picture. The first motion estimator 100 estimates motion of a right sequence frame and outputs a first motion vector 105, and the first motion estimator 110 estimates motion of a left sequence frame and outputs a second motion vector. The disparity estimator 120 performs disparity estimation between the right sequence frame and the left sequence frame and outputs a disparity vector 125.

The watermark embedding unit 130 sets the first motion vector 105 and the disparity vector 125 as a digital watermark, and when the left picture is encoded the digital watermark is embedded therein in a predetermined position.

The motion compensated encoder 140 encodes the left sequence frame by using the left picture in which the digital watermark is embedded and the second motion vector and outputs left sequence encoded data 145. Accordingly, in the moving picture encoding apparatus in accordance with the present invention, encoding information about the right picture encodes the left picture embedded in the digital watermark format, and the resulting encoded left picture data is transmitted.

The watermark embedding unit 130 predetermines a position of the digital watermark to be embedded in the left picture. Both the moving picture encoding apparatus and the moving picture decoding apparatus know the predetermined digital watermark position.

For example, in performing digital watermarking in the frequency domain, when picture data is divided into frequency bands (for example, using DFT), embedding a digital watermark in a middle frequency band shows robustness against for example, loss compression, noise, contrast disparity, brightness disparity, etc. Accordingly, a middle frequency band of picture data is preferably used as an embedded position of a digital watermark. This embedded position is preferably set as a position having small loss rate.

The left picture data may be divided into certain sized-blocks (N*M size). When the embedded position of a digital watermark is set, the watermark embedding unit 130 embeds pertinent bits of the digital watermark in the set position. Accordingly, the motion compensated encoder 140 encodes the left picture block data having the digital watermark embedded in the pertinent position.

In performing moving picture encoding using the digital watermark by embedding encoding information about the right picture in the left picture and transmitting it, it is possible to transmit the encoded moving picture data efficiently without realizing an increase in data quantity.

Figure 5:
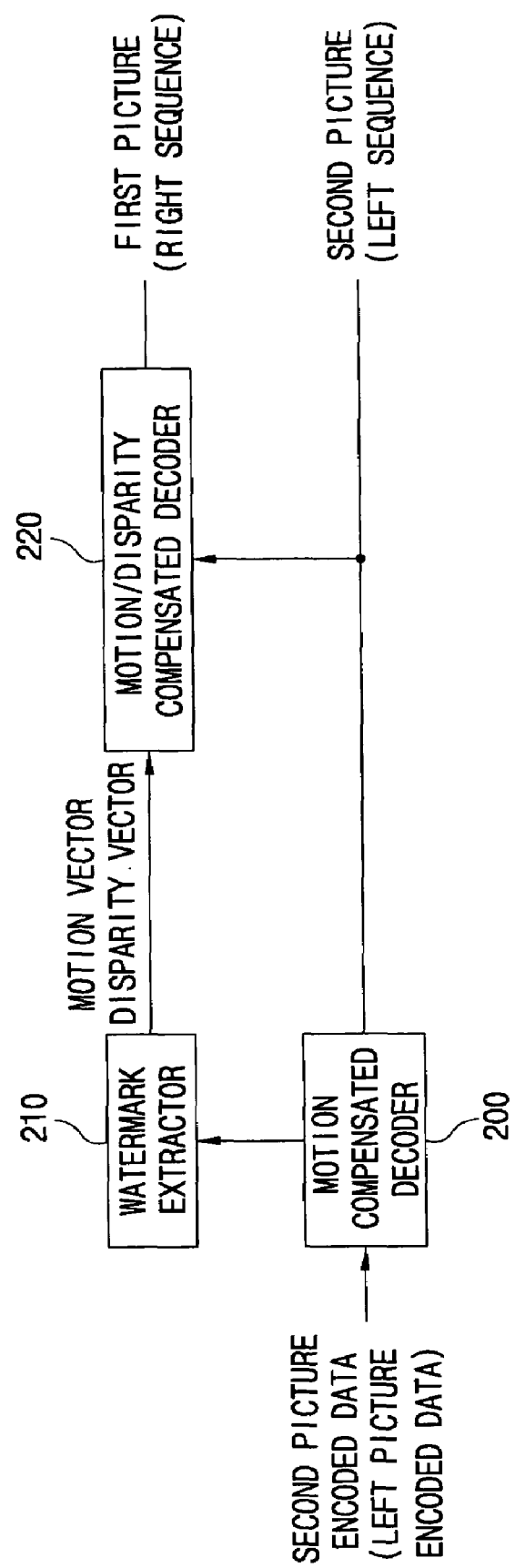
FIG. 5 is a block diagram showing a moving picture decoding apparatus which uses digital watermarking in accordance with a preferred embodiment of the present invention.

FIG. 5 is a block diagram showing a moving picture decoding apparatus using digital watermarking in accordance with a preferred embodiment of the present invention. This apparatus includes a motion compensated decoder 200, a watermark extractor 210, and a motion/disparity compensated decoder 220. The motion compensated decoder decodes second picture encoded data by motion-compensating. The watermark extractor extracts a digital watermark from a pertinent position of each frame decoded in the motion compensated decoder and determines a motion vector and a disparity vector of a first picture from the extracted digital watermark. The motion/disparity compensated decoder decodes the first picture using the motion vector and the disparity vector of the first picture and the decoded second picture.

Operation of the moving picture decoding apparatus using the digital watermarking in accordance with the present invention will now be described. In decoding a stereo moving picture, a first picture may be considered to be a right picture and a second picture may be considered to be a left picture.

In the decoding apparatus for decoding a two-dimensional moving picture without supporting a decoding function of a stereo moving picture, when left picture encoded data in which encoding information of the right picture is embedded as the digital watermark is received, the general moving picture decoding apparatus decodes only the left picture in mono mode. Accordingly, the present invention is compatible with the general moving picture decoding apparatus.

In the moving picture decoding apparatus in accordance with the present invention, when left picture encoded data in which encoding information of the right picture is embedded as the digital watermark is received, the motion compensated decoder 200 of the moving picture decoding apparatus decodes the left picture. In stereo moving picture decoding function, the watermark extractor 210 extracts the digital watermark from a pertinent position of the frame decoded in the decoding process of the left picture and determines encoding information of the right picture, namely, the motion vector and the disparity vector from the extracted digital watermark. The motion/disparity compensated decoder 220 decodes the right picture using the motion vector, the disparity vector, and the left picture decoded in the motion compensated decoder 200. Accordingly, the moving picture decoding apparatus in accordance with the present invention can restore a stereo moving picture.

Figure 1A:
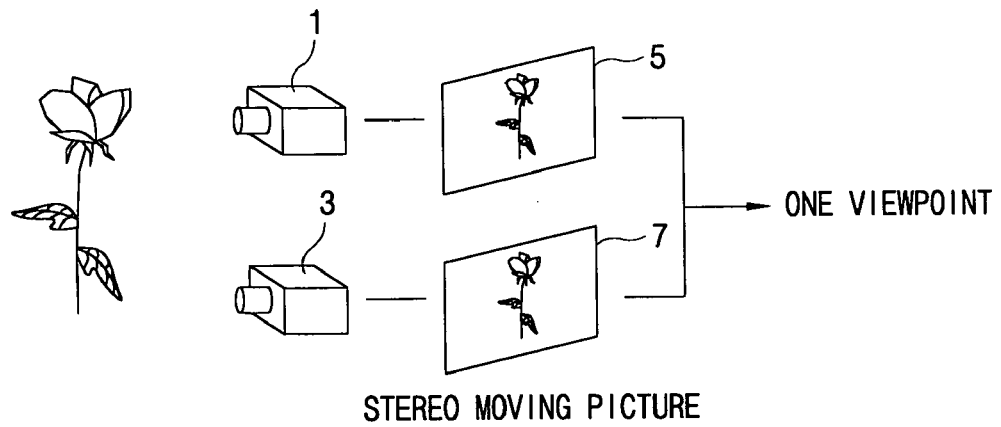
FIGS. 1A and 1B show a related-art method for obtaining a three-dimensional moving picture.
Figure 1B:
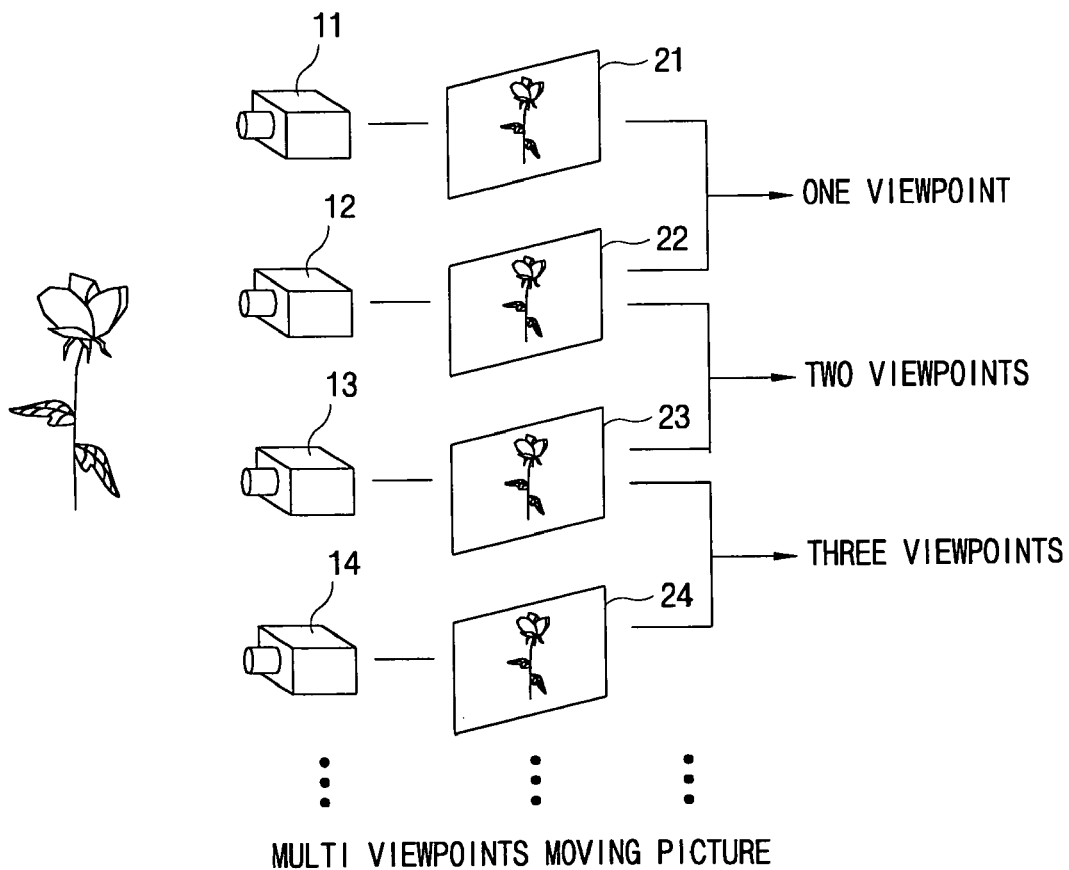
Figure 2:
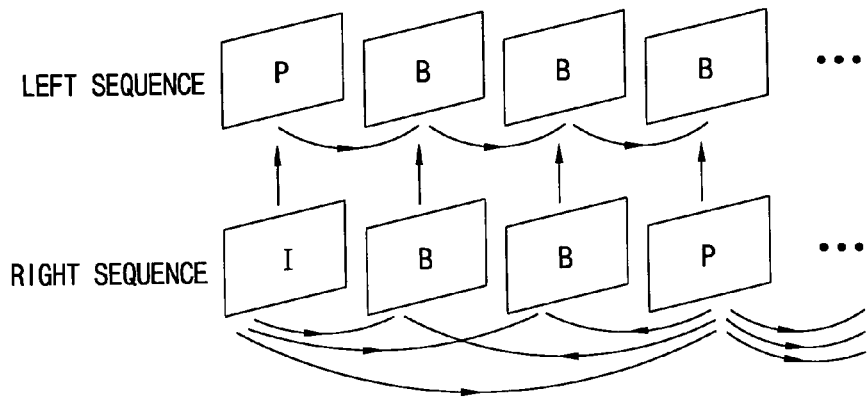
FIG. 2 shows a related-art method for estimating disparity and motion of a stereo moving picture.
Figure 3:
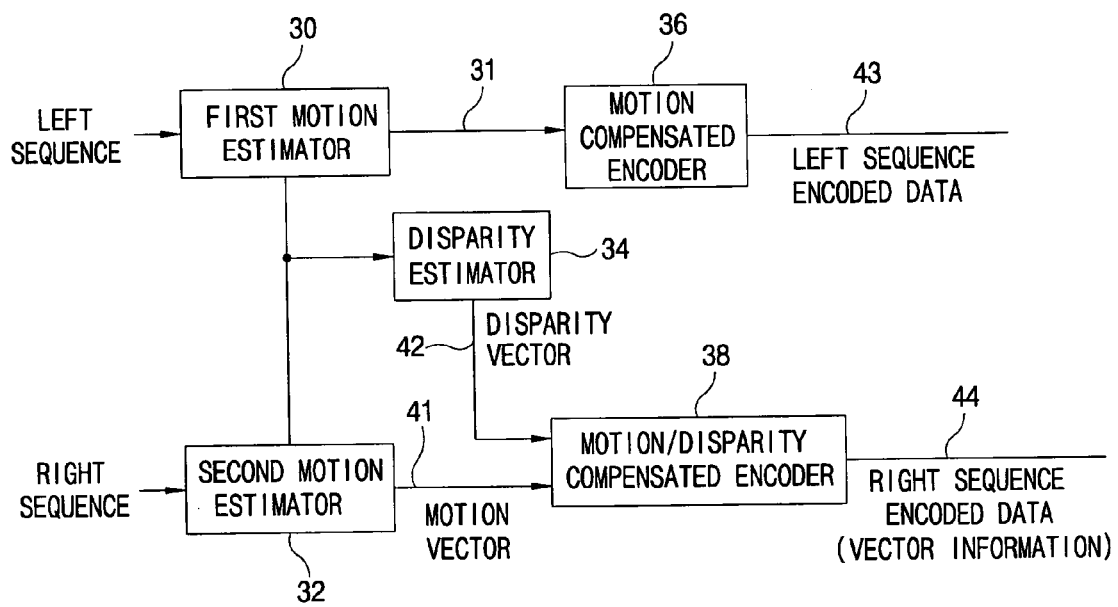
FIG. 3 is a block diagram showing of a related-art general stereo moving picture encoding apparatus.
Figure 6A:
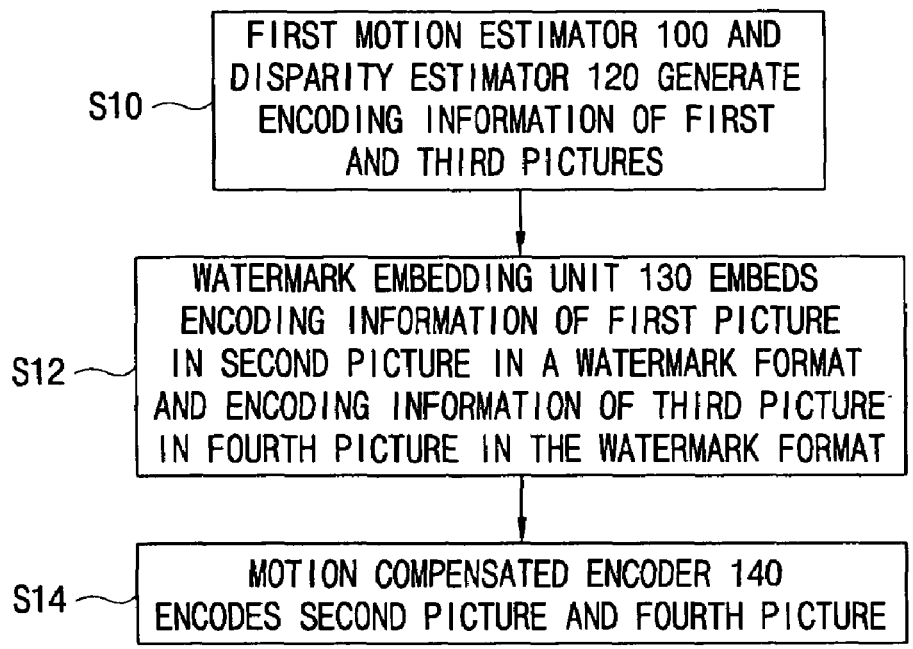
FIGS. 6A and 6B are flow diagrams showing a method for encoding and decoding a multiple view point moving picture in accordance with a preferred embodiment of the present invention.

A method for encoding a multiple viewpoint moving picture in accordance with the preferred embodiment will now be described with reference to FIG. 1B and FIG. 6A. In performing digital watermarking in the frequency domain, encoding information extracting and digital watermarking of the picture are performed by block units.

More specifically, encoding information (e.g., motion vector, disparity vector) of a first picture (obtained by a first camera 11) 21 is embedded in a second picture (obtained by a second camera 12) 22 in a digital watermarking format. The second picture 22 is then encoded. At the same time, encoding information of a third picture (obtained by a third camera 13) 23 is embedded in a fourth picture (obtained by a fourth camera 14) 24 in a digital watermark format, and the fourth picture 24 is encoded (steps S10-S14). Accordingly, when the multiple viewpoint three-dimensional moving picture consists of the first picture, the second picture, the third picture and the fourth picture, only the encoded data of the second picture and the fourth picture are transmitted without transmitting all encoded data.

Figure 6B:
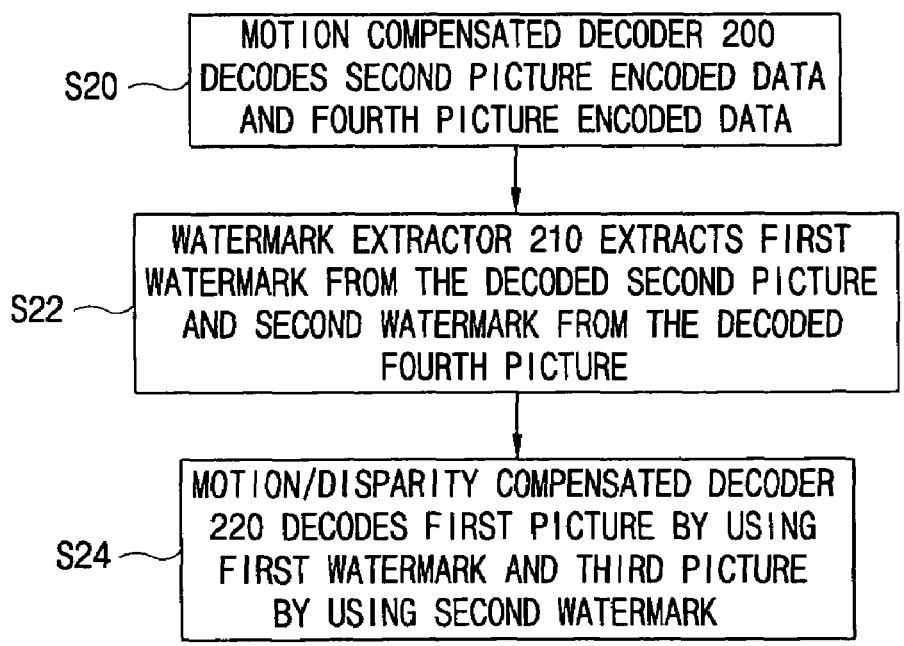

In addition, when the second picture encoded data and the fourth picture encoded data respectively having the embedded digital watermark are received, the moving picture decoding apparatus in accordance with the present invention, as shown in FIG. 6B, decodes the second picture and the first picture by extracting the digital watermark from the second picture encoded data. The fourth picture and the third picture are then decoded from the fourth picture encoded data (steps S20-S24). Accordingly, the moving picture decoding apparatus in accordance with the present invention can decode multiple viewpoint three-dimensional moving picture using the first through fourth pictures.

As described, above, in the apparatus and method for encoding a moving picture using digital watermarking in accordance with the present invention, by embedding encoding information (motion vector and disparity vector) of a picture obtained by one camera in a picture obtained by another camera as a digital watermark format and transmitting it, it is possible to perform encoding of a three-dimensional moving picture only with encoding quantity obtained by the one camera.

Also, in the apparatus and the method for encoding a moving picture using digital watermarking in accordance with the present invention, when encoded data obtained by one camera is received, it is possible to decode a three-dimensional moving picture by extracting a digital watermark from the received picture encoded data. The apparatus and method for encoding a moving picture using digital watermarking in accordance with the present invention are compatible with a general two-dimensional moving picture encoding/decoding apparatus.

Also, in the present invention, it is possible to perform encoding/decoding with a data quantity almost the same with a data quantity in encoding/decoding of the general two-dimensional moving picture. Herein, a two-dimensional image may be regarded as a binocular image. Also, mono mode may correspond to an operation mode for decoding one of a right picture and left picture, and in accordance with a preferred embodiment the left picture.

Also, the present invention as well as a stereo moving picture, in encoding/decoding of a multi viewpoints moving picture data quantity can be substantially reduced compared to related-art encoding/decoding methods.

What is claimed is:

1. An apparatus comprising:
   an encoder which encodes information of a first moving picture in a second moving picture as a digital watermark, wherein the digital watermark generated is based on (1) a first motion vector derived from the first moving picture and (2) a disparity vector generated based on the first moving picture and the second moving picture,
      wherein the first and second moving pictures form a stereo moving picture with the first moving picture corresponding to one of a left or right picture and the second moving picture corresponding to the other one of the left or right picture, wherein the encoder encodes the digital watermark in the second moving picture through motion compensation, and
      wherein the digital watermark is embedded at a position of the second moving picture that corresponds to a predetermined band of a frequency domain representation of the second moving picture; and
   a decoder which extracts the digital watermark from the second moving picture-encoded data transmitted from the encoder, and decodes the second moving picture, and motion-compensated decodes the first moving picture based on the first motion vector and disparity vector included in the extracted digital watermark,
   wherein the predetermined band of the frequency domain representation of the second moving picture into which position the digital watermark is embedded is located between a first frequency band and a second frequency band of the frequency domain representation, and wherein the first and second frequency bands include information of the first moving picture encoded by the encoder into the second moving picture.

2. The apparatus of claim 1, wherein the first moving picture is obtained from a first camera and the second moving picture is obtained from a second camera, and wherein the stereo moving picture is formed having one viewpoint from the first moving picture and the second moving picture.

3. The apparatus of claim 1, wherein the first moving picture is one of at least two moving pictures used to configure a multiple viewpoint three-dimensional moving picture, and the second moving picture is the other one of the at least two moving pictures used to configure the multiple viewpoint three-dimensional moving picture.

4. The apparatus of claim 1, wherein the encoding information of the first moving picture includes the first motion vector of the first moving picture and the disparity vector generated based on the first moving picture and the second moving picture.

5. The apparatus of claim 1, wherein the encoder includes:
   a watermark embedding unit which sets the first motion vector of the first moving picture and the disparity vector between the first moving picture and the second moving picture as the digital watermark and embeds the digital watermark in the second moving picture at the position that corresponds to a predetermined band of the frequency domain representation of the second moving picture; and
   a motion compensated encoder to encode the second moving picture in which the digital watermark is embedded.

6. The apparatus of claim 5, wherein the encoder further includes;

a first motion estimator which estimates motion of the first picture and outputs the first motion vector;

a second motion estimator which estimates motion of the second picture and outputs a corresponding second motion vector; and a disparity estimator which performs disparity estimation between the first picture and the second picture and outputs the disparity vector.

7. The apparatus of claim 1, wherein the decoder includes:

a motion compensated decoder which decodes the second moving picture-encoded data using motion compensation;

a watermark extractor which extracts the digital watermark from the position of the second moving picture that corresponds to a predetermined band of the frequency domain representation of the second moving picture and is decoded in the motion compensated decoder, and determines a motion vector and a disparity vector of the first moving picture from the extracted watermark; and a motion/disparity compensated decoder which decodes the first moving picture using the motion vector and the disparity vector of the first moving picture and the decoded second moving picture.

8. The apparatus of claim 7, further comprising:

storing information indicative of the predetermined position of the watermark in the encoder and decoder.

9. The apparatus of claim 8, wherein the predetermined position is a position having a smallest loss rate of the digital watermark.

10. A method for use with an imaging apparatus comprising:

setting encoding information of a first picture obtained by one camera as a digital watermark, wherein the digital watermark generated is based on (1) a first motion vector derived from the first picture and (2) a disparity vector generated based on the first picture and a second picture;

digital-watermarking the second picture obtained by another camera;

motion compensated encoding the digital watermarked second picture transmitting the encoded second picture; and motion compensated decoding the transmitted second picture, wherein:

the digital watermark is embedded in the second picture at a position that corresponds to a predetermined band of a frequency domain representation of the second picture, the first and second moving pictures form a stereo moving picture with the first moving picture corresponding to one of a left or right picture and the second moving picture corresponding to the other one of the left or right picture, and the predetermined band of the frequency domain representation of the second picture into which position the digital watermark is embedded is located between a first frequency band and a second frequency band of the frequency domain representation, and wherein the first and second frequency bands include information of the first picture encoded by the encoder into the second picture.

11. The method of claim 10, wherein the first picture is one of at least two pictures used to configure multiple viewpoint three-dimensional moving picture, and the second picture is another of the at least two pictures used to configure the multiple viewpoint three-dimensional moving picture.

12. The method of claim 10, wherein the encoding information of the first picture includes the first motion vector of the first picture and the disparity vector between the first picture and the second picture.

13. The method of claim 10, wherein motion compensated-decoding includes:

decoding the transmitted second picture;

extracting the digital watermark from the position of the decoded second picture frame that corresponds to a predetermined band of the frequency domain representation of the second picture;

determining the motion vector and the disparity vector of the second picture using the extracted digital watermark; and decoding the first picture using the decoded second picture and the determined motion vector and disparity vector.

14. A method to be used with an imaging apparatus for encoding picture data, comprising:

generating a digital watermark from a first moving picture signal;

embedding the watermark into a second moving picture signal at a position that corresponds to a predetermined band of a frequency domain representation of the second moving picture signal; and encoding the second moving picture signal with the embedded watermark, wherein the digital watermark is generated is based on (1) a first motion vector derived from the first moving picture signal and (2) a disparity vector generated based on the first moving picture signal and the second moving picture signal, wherein the first and second moving picture signals form a stereo moving picture signal with the first moving picture signal corresponding to one of a left or right picture and the second moving picture signal corresponding to the other one of the left or right picture, and wherein the predetermined band of the frequency domain representation of the second picture into which position the digital watermark is embedded is located between a first frequency band and a second frequency band of the frequency domain representation, and wherein the first and second frequency bands include information of the first moving picture encoded by the encoder into the second moving picture.

15. A method of claim 14, further comprising:

deriving the first motion vector from a first moving picture sequence;

deriving a second motion vector from a second moving picture sequence; and generating the disparity vector based on a difference between the first and second motion vectors.

16. The method of claim 14, wherein encoding the second moving picture signal includes motion compensation.

17. The method of claim 14, further comprising:

deriving the first moving picture signal from one of a left and right picture sequence; and deriving the second moving picture signal from the other of the left and right picture sequence.

18. The method of claim 14, wherein the predetermined frequency band is a middle frequency band which shows robustness against at least one of loss compression, noise, contrast disparity, and brightness disparity.

19. An apparatus for encoding picture data, comprising:

a generator which generates a digital watermark from a first moving picture signal;

an embedder which embeds the digital watermark into a second moving picture signal, wherein the digital watermark is embedded at a position that corresponds to a predetermined band of a frequency domain representation of the second moving picture signal; and an encoder which encodes the second moving picture signal with the embedded watermark, wherein the generator generates the digital watermark based on (1) a first motion vector derived from the first moving picture signal and (2) a disparity vector generated based on the first moving picture signal and the second moving picture signal, wherein the first and second moving picture signals form a stereo moving picture signal with the first moving picture signal corresponding to one of a left or right picture and the second moving picture signal corresponding to the other one of the left or right picture, and wherein the predetermined band of the frequency domain representation of the second picture into which position the digital watermark is embedded is located between a first frequency band and a second frequency band of the frequency domain representation, and wherein the first and second frequency bands include information of the first moving picture encoded by the encoder into the second moving picture.

20. The apparatus of claim 19, further comprising:

a first estimator which generates the first motion vector from a first moving picture sequence;

a second estimator which generates a second motion vector from a second moving picture sequence; and a third estimator which generates the disparity vector based on a difference between the first and second motion vectors.

21. The apparatus of claim 19, wherein the encoder motion compensates the second moving picture signal.

22. The apparatus of claim 19, wherein the first moving picture signal is derived from one of a left and right picture sequence and the second moving picture signal is derived from the other of the left and right picture sequence.

23. The apparatus of claim 19, wherein the embedder embeds the watermark in a frequency domain of picture data associated with the second moving picture signal.

24. The apparatus of claim 19, wherein the predetermined frequency band is a middle frequency band which shows robustness against at least one of loss compression, noise, contrast disparity, and brightness disparity.

25. The apparatus of claim 1, wherein the encoded second moving picture including the digital watermark is transmitted without transmitting the first moving picture.

26. The apparatus of claim 1, wherein the position of the second moving picture that corresponds to a predetermined frequency band of the frequency domain representation of the second moving picture is a position having a predetermined loss rate.

27. The method of claim 1, wherein the position of the second moving picture that corresponds to a predetermined frequency band of the frequency domain representation of the second moving picture is a position having a predetermined loss rate.

28. The method of claim 14, wherein the position of the second moving picture signal that corresponds to a predetermined frequency band of the frequency domain representation of the second moving picture signal is a position having a predetermined loss rate.

29. The apparatus of claim 19, wherein the position of the second moving picture signal that corresponds to a predetermined frequency band of the frequency domain representation of the second moving picture signal is a position having a predetermined loss rate.

* * * * *